United States Patent [19]

Ritchey et al.

[11] Patent Number: 5,688,547

[45] Date of Patent: Nov. 18, 1997

[54] MEAL REPLACEMENT COMPOSITION AND METHOD OF WEIGHT CONTROL

[75] Inventors: Thomas William Ritchey, Bergen, N.J.; Douglas C. Becker, Orange; Jack Gray, Suffolk, both of N.Y.

[73] Assignee: American Cyanamid Company, Madison, N.J.

[21] Appl. No.: 725,033

[22] Filed: Jul. 3, 1991

Related U.S. Application Data

[63] Continuation-in-part of Ser. No. 562,357, Aug. 3, 1990, abandoned, and Ser. No. 562,186, Aug. 3, 1990, abandoned.

[51] Int. Cl.⁶ .................. A23L 1/05; A23L 1/187
[52] U.S. Cl. .............. 426/573; 426/579; 426/804
[58] Field of Search ................. 426/573, 578, 426/579, 577, 804

[56] References Cited

U.S. PATENT DOCUMENTS

| | | | |
|---|---|---|---|
| 3,988,511 | 10/1976 | Schapiro | 426/580 |
| 3,993,793 | 11/1976 | Finney | 426/654 |
| 4,042,687 | 8/1977 | Gans et al. | 424/177 |
| 4,058,636 | 11/1977 | Igoe | 426/573 |
| 4,089,981 | 5/1978 | Richardson | 426/104 |
| 4,091,120 | 5/1978 | Goodnight et al. | 426/598 |
| 4,216,242 | 8/1980 | Braverman | 426/660 |
| 4,251,550 | 2/1981 | Proctor | 426/804 |
| 4,264,637 | 4/1981 | Braverman | 426/593 |
| 4,268,529 | 5/1981 | Davis | 426/72 |
| 4,298,601 | 11/1981 | Howard | 424/128 |
| 4,495,206 | 1/1985 | Wein | 426/250 |
| 4,497,800 | 2/1985 | Larson | 426/804 |
| 4,565,702 | 1/1986 | Morley et al. | 426/93 |
| 4,568,557 | 2/1986 | Becker et al. | 426/618 |
| 4,619,831 | 10/1986 | Sharma | 426/93 |
| 4,673,578 | 6/1987 | Becker et al. | 426/93 |
| 4,695,474 | 9/1987 | Cuneo | 426/579 |
| 4,707,376 | 11/1987 | Muraoka | 426/804 |
| 4,710,390 | 12/1987 | Schumacher | 426/804 |
| 4,784,861 | 11/1988 | Gori | 426/74 |
| 4,833,128 | 5/1989 | Solomon et al. | 514/23 |
| 4,834,990 | 5/1989 | Amer | 426/804 |
| 4,853,237 | 8/1989 | Prinkkila et al. | 426/590 |
| 4,877,627 | 10/1989 | Leitz et al. | 426/285 |
| 5,021,245 | 6/1991 | Borschel | 426/801 |

FOREIGN PATENT DOCUMENTS

| | | | |
|---|---|---|---|
| 1417937 | 12/1975 | United Kingdom | 426/591 |

OTHER PUBLICATIONS

Avicel Application Bulletin Number RC-34.
Avicel Micro Crystalline Cellulose Product Description Bulletin G-34 1985.
Avicel MCC Product Description Bulletin G-34 1982.
Avicel Application Bulletin, No. C-42 (Mar. 1986).

*Primary Examiner*—Carolyn Paden
*Attorney, Agent, or Firm*—William H. Calnan

[57] ABSTRACT

A dry nutritional meal replacement composition based on the formulation comprising inter alia a protein blend comprising protein concentrate in an amount of about 4.0–86.0% by weight; a blend comprising a cellulose gel and carboxymethyl cellulose gum in an amount of about 2.3–93.0% by weight; a vitamin blend in an amount of about 0.1–12.0% by weight; a mineral blend in an amount of about 0.1–19.0% by weight; a natural or artificial sweetener in an amount of about 0.1–80.0% by weight; dietary fibers other than the cellulose blend in an amount of up to about 66% by weight; and an effective amount of a flavoring agent, alone, or in combination with a coloring agent. The composition, when mixed with an ingestable liquid, such as milk, and shaken at low shear forms a shake, and when mixed at high shear forms a mousse. When ingested, the mixed composition elicits satiety and can be used as a total meal replacement without adverse gastrointestinal disturbances.

4 Claims, No Drawings

MEAL REPLACEMENT COMPOSITION AND METHOD OF WEIGHT CONTROL

CROSS REFERENCE TO RELATED APPLICATIONS

This application is a continuation-in-part of commonly-assigned U.S. patent applications Ser. No. 07/562,357, filed Aug. 3, 1990, "Meal Replacement Compositions and Method of Weight Control", Thomas William Ritchey, Douglas C. Becker and Jack Gray, and now abandoned, and Ser. No. 07/562,186, filed Aug. 3, 1990, "Fiber Formulation", Thomas William Ritchey, and now abandoned.

BACKGROUND OF THE INVENTION

This invention relates generally to a dry food composition adapted for mixing with an ingestable liquid, e.g., milk, to form a liquid composition useful as a total meal replacement in connection with weight control and, more particularly, it is directed to a dry food composition which, when mixed with milk, or other ingestable liquid, forms a highly palatable shake or pudding composition, high in protein and fiber.

Various dry food compositions and dietary formulations have been developed heretofore. Most are adapted primarily for mixing with water and are designed to provide a high protein diet (U.S. Pat. Nos. 3,097,941, 3,950,547, 4,251,550 and 4,784,861). However, the prior art either fails to elicit satiety or suffers from other drawbacks.

In order for any food composition used as a weight control formulation to be of significant value and be acceptable as a total replacement for at least one meal each day over an extended period, it is essential that the composition be highly palatable, elicit satiety between meals and be highly nutritious. Moderation and variety are often the key to good nutrition. This means avoiding excesses and deficiencies of individual nutrients, as well as frequently monitoring what is eaten to be sure that all the proper vitamins, minerals, proteins, fats and carbohydrates and fibers are obtained. Malnutrition, or bad nutrition, does not mean just eating a diet too low in essential nutrients and calories. Malnutrition also means eating too much, eating the wrong foods, or eating in an unbalanced fashion. Health experts now recognize that excess body weight, particularly if acquired early in life, can be a major health hazard. Excess weight can be a risk factor for heart disease, can result in a rise in blood pressure, makes diabetes harder to control, and is associated with an increased prevalence of certain cancers. It puts more strain on the weight-bearing joints, such as knees and spine, and in many other ways impair one's health.

The food composition of the present invention is designed to provide the essential nutritional and health needs of an individual when used as a total meal replacement at least once each day for an extended period and contains a relatively high concentration of protein, fiber, vitamins, minerals and proteins. In fact, three daily servings of the meal replacement composition of the present invention with milk provides one hundred percent of important vitamins, minerals and proteins. Additionally, the composition of the present invention is designed to take the hunger out of losing weight. It fills an individual up naturally, without drugs that can create nervousness or drowsiness. Each serving provides six (6) grams of healthy, filling fiber. Two types of dietary fibers are used, soluble and insoluble (in water), and these can include, e.g., guar gum, pectin, gum arabic and oat fiber, specifically, the kinds that the Surgeon General says can help lower cholesterol.

There is a strong current awareness of the importance of high fiber diets. James W. Anderson discusses dietary fiber in the article "Physiological and Metabolic Effects of Dietary Fiber", Federation Proc. 44:2902–2906 (1985). Suggested therein is the fact that the high incidence of colon cancer, coronary heart disease, diabetes, obesity, hypertension and certain other diseases relates to a low intake of dietary fiber. It is also mentioned that clinical and physiological studies indicate that fiber affects gastrointestinal function.

In the proceedings of the Society For Experimental Biology and Medicine, 180, 132–446 (1985), George V. Vahouny and Marie M. Cassidy report on dietary fibers and the absorption of nutrients. Therein it is stated that the intestinal absorption of nutrients can be influenced by modifying the rate at which food enters and leaves the stomach. It is stated that high fiber, bulkier foods may require longer periods for ingestion and thereby modify the rates of gastric filling.

A. H. Ross, et al. discussed the metabolism and mode of action of dietary fiber in the article, "A Study of the Effects of Dietary Gum Arabic in Humans", The American Journal of Clinical Nutrition 37:368–373 (1983). Therein it is stated that the ingestion of gum arabic functions to decrease the level of serum cholesterol.

However, none of these articles relate to the interaction between the different types of mixed cellulose sources and/or brans set forth in the present invention to produce the claimed highly palatable, highly nutritious food composition. In particular, besides blending into a delicious shake when mixed with an ingestable liquid, such as milk, the composition of the present invention becomes a delicious instant pudding or mousse when mixed in a blender for about thirty (30) seconds. This innovative formulation discovery creates advantages in product versatility, portability and variety which gives the present invention a unique element of appeal.

SUMMARY OF THE INVENTION

The invention accordingly is directed to a composition for use as a complete meal replacement to elicit a sensation of satiety and to inhibit feeding, while providing a high source of vitamins, minerals, fibers and proteins to create a nutritionally balanced diet as part of a weight control program. Dieting, with ensuing weight loss, is thus made easier.

The invention is further directed to a composition having a novel mixed cellulose component which, when blended with an ingestable liquid, such as milk, produces a highly palatable, highly nutritious instant shake or pudding or mousse. Another object of the invention is to provide an improved weight control product which is readily and conveniently employed such as by the blending of the same with milk or other ingestable liquid, prior to the ingesting of the blended product.

Yet another object of the invention is to provide an improved method for the formulation of an improved weight control substance.

In accordance with the present invention there are provided dry, nutritional meal replacement compositions adapted to mix with a liquid to provide drinkable beverage when mixed with low shear and a pudding when mixed with high shear, the compositions comprising a mixture of a cellulose gel and a cellulose gum.

A preferred feature of the invention comprises dry nutritional meal replacement compositions comprising (A) a protein blend comprising protein concentrate in an amount of about 4.0–86.0% by weight;

(B) a blend comprising a cellulose gel and cellulose gum in an amount of about 2.3–93.0% by weight;

(C) a vitamin blend in an amount of about 0.1–12.0%;

(D) a mineral blend in an amount of about 0.1–19.0% by weight;

(E) a natural or an artificial sweetener or a mixture thereof in an amount of about 0.1–80.0% by weight;

(F) dietary fibers other than (B) in an amount of up to about 66% by weight; and (G) an effective amount of a flavoring agent, alone or in further combination with a coloring agent.

Also contemplated by the invention is a method for weight control comprising eliciting satiety by mixing the composition as above defined with an ingestable liquid, e.g., milk, water, a flavored carbonated or still beverage, fruit or vegetable juice, or a mixture of any of the foregoing, and ingesting the same as a complete meal replacement.

DESCRIPTION OF THE PREFERRED EMBODIMENTS

The substance of the invention is a scientifically balanced formulation of protein, carbohydrate, fat, dietary fibers, vitamins and minerals at an appropriate caloric content. The compositions of the invention can provide for all fiber varieties known to generate specific health effects derived from regular fiber intake. As previously mentioned, the compositions and methods of the invention not only provide all the benefits known to derive from a balanced formulation of cellulose derivatives as well as other dietary fibers, but will also reduce appetite to thus enable weight control.

The critical component of the present invention is comprised of a mixture of a cellulose gel and a cellulose gum. Preferably, the amount of cellulose gel comprises from about 1.4 to about 51 parts by weight and the amount of cellulose gum comprises from about 0.8 to about 42 parts by weight, all parts being based on 100 parts by weight of the total composition. More preferably, the cellulose gel comprises from about 6 to about 10 parts by weight and said cellulose gum comprises from about 2 to about 5 parts by weight. Most preferably, the cellulose gel comprises about 7.22 parts by weight and the cellulose gum comprises about 3.02 parts by weight. Special mention is made of compositions wherein the cellulose gel comprises a mixture of spray-dried colloidal cellulose (microcrystalline cellulose) and sodium carboxymethyl cellulose and the cellulose gum comprises sodium carboxymethyl cellulose. In general, preferred features include compositions comprising a cellulose gel and a cellulose gum in a weight ratio of from about 1:0.24 to about 1:1.30, and especially those wherein the ratio is about 1:0.44. A source of the the preferred cellulose gel is FMC Corporation, Philadelphia, Pa. 19103, under the trademark Avicel® Microcrystalline Cellulose Type CL-611; and of the cellulose gum is Multi-Kem Corporation, Ridgefield, N.J. 07657, under the trademark CELLOGEN HP6HS.9®. It is preferred to include gum arabic because it provides for greater satiety without the many adverse gastrointestinal disturbances associated with known meal replacement compositions.

This particular blend, when mixed under low shear with ingestable liquid, e.g., milk, imparts thickness to the composition to provide a shake having better frothiness and taste. When mixed with milk under high shear, e.g., in a blender for about 30 seconds, the mixture becomes aerated and gelled to create a delicious instant mousse pudding. Accordingly, this adds a significantly added dimension to a regular weight control program because an individual can not only enjoy a great tasting, highly nutritious liquid dietetic drink, but can also more completely satisfy his appetite by having a truer foodstuff with great mouth-feel, such as a pudding or mousse. There is no other dietary liquid composition heretofore known which uses a cellulose gel and a cellulose gum to create a mousse or pudding. For the purposes of this disclosure and the appended claims, low shear corresponds to mixing in a hand shaker for from about 30 to about 50 shakes, and high shear corresponds to mixing in a high speed blender for about 30 seconds.

Accordingly, the present invention provides a significant advantage over known products. Of course, once the composition has been made into a pudding, it can be further placed into the freezer to create a frozen treat. The foregoing advantages are surprising because when two thixotropic materials, each of which normally thins out when sheared, are put together and sheared, the blend becomes thick. This is exactly the opposite of what would be expected to happen.

Such behavior is not observed at all ratios of the two ingredients, because as will be shown decreasing the amounts of either will result in a mixture that will not thicken when shaken, and using too much is not economically prudent.

To the blend of cellulose derivatives there can also be added other dietary fibers, such as oat bran, corn bran, pectin, gum arabic, guar gum, soy fiber or a mixture of any of them, in a combined amount of about 1–66% by weight, preferably about 8% by weight, exclusive of the cellulose gel and cellulose gum, to provide for true nutritional completeness. The level of nutrition is further enhanced by adding essential vitamins and minerals to the fiber formulation. A total of 0.1–12.0% by weight, preferably about 0.81% by weight, of vitamins selected from the group consisting of Vitamin A, Vitamin C, Vitamin B1, Vitamin B2, Niacinamide, Vitamin D, Vitamin E, Vitamin B6, Folic Acid, Vitamin B12, Biotin, Pantothenic Acid, Vitamin K, or a mixture of any of the foregoing, can be made a part of the meal replacement composition. The mineral blend preferably comprises a total of 0.1–19% by weight, more preferably, about 1.4% by weight, of minerals consisting of phosphorus, iodine, magnesium, zinc, copper, manganese, chromium, molybdenum, calcium, potassium, sodium, iron, or a mixture of any of the foregoing. Such additives can be used at any safe level but preferably they will be present at ⅓ the minimum RDA levels.

Additionally, the particular selection of proteins and sugars of the present invention enables the composition to mix well and helps create the higher level of palatability. As is generally well understood, protein provides nutrition, body and mouth feel, and promotes aeration and opacity. Furthermore sugars can be reduced or eliminated by the use of artificial sweeteners. Preferred embodiments comprise 4.0–86.0% by weight of protein, e.g., 1.8–38.7 wt % whey protein concentrate, 1.1–28.7 wt % casein (sodium/calcium), 1.1–28.7 wt % soy protein isolate, 0.1–80.0% by weight of sweetener, e.g., sucrose, fructose, aspartame or other artifical sweetener, e.g., saccharine, acesulfame-K (SUNETTE® Hoechst, N.J., USA), and the like. There can be further added thereto a small effective amount of a flavoring agent, such as cocoa or vanilla flavor and the like, as well as coloring agents, and the like. Of course, other flavoring agents, such as strawberry, coffee, or orange, can be used.

The following examples illustrate the preparation of dry food compositions of the present invention and describes the manner of using the compositions.

EXAMPLE 1

The ingredients for a dry food composition and the proportions used on a part by weight basis are as follows:

| Ingredients | Serving Unit 34.4 Grams (Dry) |
|---|---|
| Group I | |
| Sucrose | 12.63 grams |
| Fructose | 0.50 grams |
| Aspartame | 0.01 grams |
| Cocoa Dutch | 5.0 grams |
| Potassium Chloride | 0.33 grams |
| Sodium Chloride | 0.036 grams |
| Group II | |
| Whey Protein Concentrate | 3.85 grams |
| Caseinate, Sodium Calcium | 2.35 grams |
| Soy Isolate | 2.35 grams |
| Mineral Blend | 0.47 grams |
| Vitamin Blend | 0.28 grams |
| Vanilla Flavor | 0.38 grams |
| Group III | |
| Cellulose gel[a] | 2.92 grams |
| Gum Arabic | 2.15 grams |
| Cellulose gum[b] | 0.60 grams |
| Oat Bran | 0.13 grams |
| Pectin | 0.13 grams |
| Corn Bran | 0.12 grams |
| Guar Gum | 0.12 grams |

[a] FMC Corporation Avicel ® Cellulose Type CL-611 (comprised of a spray-dried colloidal mixture of cellulose gel (microcrystalline cellulose) and cellulose gum (sodium carboxy methyl cellulose) (in a weight ratio of gel to gum of approximately 85–15).
[b] MULTI-KEM Corporation CELLOGEN ® CMC-HP6H5.9 Sodium Carboxymethylcellulose In preparing the dry food mixture, the ingredients in Group I are added to a ribbon mixer through a 20 mesh screen and mixed for five (5) minutes. After mixing is completed and the blender has come to a complete stop, Group II ingredients are added to the mixer through the screen and the total is mixed for an additional five (5) minutes. After the mixer has come to a complete stop, Group III ingredients are added to the mixture through the screen and mixed for an additional fifteen (15) minutes.

For the average healthy adult, each serving unit of the dry composition of the foregoing specific example supplies about 7 grams of protein, about 17 grams of carbohydrate and about 6 grams of fiber. When mixed with eight (8) fluid ounces of Vitamin A and D protein fortified 1% low fat milk, each serving provides about 17 grams of protein, about 33 grams of carbohydrates and about 6 grams of fiber, plus essential vitamins and minerals.

The vitamins/minerals formulation in the above example is set forth in more detail in Table 1 below:

TABLE 1

| | NUTRIENTS IN BASE FORMULA | VITAMIN/ MIN PREMIX | TOTAL FROM FINAL FORMULA | PERCENT OF URSDA | A&D PROTEIN FORTIFIED 1% LOWFAT MILK | TOTAL FROM FINAL FORMULA PLUS 8 OZ. 1% LOW FAT MILK | PERCENT OF USRDA |
|---|---|---|---|---|---|---|---|
| VITAMIN A (as Acetate) | | 1250.000 IU | 1250.000 IU | 25% | 500.000 IU | 1750.000 IU | 35% |
| VITAMIN C (Ascorbic Acid) | | 18.000 MG | 18.000 IU | 30% | 2.830 MG | 20.830 MG | 35% |
| VITAMIN B1 (Thiamine) | | 0.450 MG | 0.450 MG | 30% | 0.111 MG | 0.561 MG | 35% |
| VITAMIN B2 (Riboflavin) | | 0.170 MG | 0.170 MG | 10% | 0.472 MG | 0.642 MG | 35% |
| NIACINAMIDE | | 7.000 MG | 7.000 MG | 35% | 0.246 MG | 7.246 MG | 35% |
| CALCIUM | 50.000 MG | 150.000 MG | 200.000 MG | 20% | 349.000 MG | 549.000 MG | 50% |
| IRON | | 6.300 MG | 6.300 MG | 35% | 0.150 MG | 6.450 IU | 35% |
| VITAMIN D | | 40.000 IU | 40.000 IU | 10% | 100.000 IU | 140.000 IU | 35% |
| VITAMIN E | | 10.500 IU | 10.500 IU | 35% | | 10.500 IU | 35% |
| VITAMIN B6 (Pyridoxine MCI) | | 0.600 MG | 0.600 MG | 30% | 0.123 MG | 0.723 MG | 35% |
| FOLIC ACID | | 128.000 MCG | 128.000 MCG | 25% | 15.000 MCG | 143.000 MCG | 35% |
| VITAMIN B12 (as Cyanocobalamin) | | 1.200 MCG | 1.200 MCG | 20% | 1.045 MCG | 2.245 MCG | 35% |
| PHOSPHORUS (as DCP) | 89.000 MG | 116.000 MG | 205.000 MG | 20% | 273.000 MG | 478.000 MG | 45% |
| IODINE (as Potassium) | | 15.000 MCG | 15.000 MCG | 10% | 37.000 MCG | 52.000 MG | 35% |
| MAGNESIUM (as Oxide) | 25.000 MG | 81.000 MG | 106.000 MG | 20% | 39.000 MG | 145.000 MG | 35% |
| ZINC (as Oxide) | | 4.500 MG | 4.500 MG | 30% | 1.110 MG | 5.610 MG | 35% |
| COPPER (as Oxide) | | 0.700 MG | 0.700 MG | 35% | | 0.700 MG | 35% |
| BIOTIN | | 105.000 MCG | 105.000 MCG | 35% | | 105.000 MCG | 35% |
| PANTOTHENIC ACID (as Cal Panto) | | 2.500 MG | 2.500 MG | 25% | 0.918 MG | 3.418 MG | 35% |
| MAGNANESE (as Sulfate) | | 1.000 MG | 1.000 MG | * | | 1.000 MG | * |
| CHROMIUM | | 20.000 MG | 20.000 MCG | * | | 20.000 MG | * |

TABLE 1-continued

|  | NUTRIENTS IN BASE FORMULA | VITAMIN/ MIN PREMIX | TOTAL FROM FINAL FORMULA | PERCENT OF URSDA | A&D PROTEIN FORTIFIED 1% LOWFAT MILK | TOTAL FROM FINAL FORMULA PLUS 8 OZ. 1% LOW FAT MILK | PERCENT OF USRDA |
|---|---|---|---|---|---|---|---|
| (as Chloride) MOLYBDENUM (as Sodium Molybdate) |  | 25.000 MCG | 25.000 MCG | * |  | 25.000 MCG | * |
| VIT K (as Phytonadione) |  | 20.000 MCG | 20.000 MCG | * |  | 20.000 MCG | * |

* No USRDA Established

When preparing the dry food composition of the present invention for use, eight (8) fluid ounces of Vitamin A and D protein fortified 1% low fat milk is poured into a shaker or blender and the contents of one unit serving of the composition of the present invention is emptied into the milk-containing shaker or blender. The dry food composition and milk are shaken for approximately 25 seconds or mixed in a blender for about 5–10 seconds. The resulting composition is a thick, smooth, highly palatable shake which can be used as a total replacement for at least one meal each day and provide a sensible eating formula for those desiring to limit their caloric intake. Additionally, if the dry composition and milk are mixed in a blender for about 30 seconds, there is provided a rich, thick, instant pudding or mousse having exceptional mouth-feel. The pudding composition of the invention provides the dieter with something more substantial to eat, instead of just liquid to drink, thereby resulting in continued use of the meal replacement composition and providing for a more successful weight control program. The composition of the present invention provides a complete, well balanced diet including a relatively large amount of protein, fiber and essential vitamins and minerals.

EXAMPLES 1*–33

The effect of various gums and cellulose derivatives on the mousse characteristics of dry powder base compositions containing soluble carbohydrates and salts is determined by first preparing a base formulation and then adding to each 13.5 g thereof 200 g of water (20 degrees C.) and the additional materials and shearing at high speed on a Waring Blender for 30 seconds. The base composition was as follows:

| Component | Parts by weight |
|---|---|
| Sucrose | 12.63 |
| KCl | 0.334 |
| NaCl | 0.036 |
| Fructose | 0.50 |
|  | 13.50 |

After high shear blending the compositions are observed for the attributes of mousse formation: whether or not they gel, whether or not they are thick, whether or not they are aerated, and whether or not they are opaque. Desirable formulations are gelled, they are thick, they are aerated, and they are opaque. The formulations used and the results obtained are set forth in Table 2 in which the abbreviations for the observations have the following meanings:
SL. SLIGHT
V.SL. VERY SLIGHT
MOD. MODERATE

TABLE 2

Composition Comprising Cellulose/Fiber/Protein/Gum Additives

| Example Composition (pbw): | 1* | 2* | 3* | 4 | 5 | 6 | 7 | 8 | 9 | 10 |
|---|---|---|---|---|---|---|---|---|---|---|
| Base (a) | 13.5 | 13.5 | 13.5 | 13.5 | 13.5 | 13.5 | 13.5 | 13.5 | 13.5 | 13.5 |
| Water | 200.0 | 200.0 | 200.0 | 200.0 | 200.0 | 200.0 | 200.0 | 200.0 | 200.0 | 200.0 |
| Colloidal Mixture, cellulose gel/cellulose gum (b) | — | — | 1.46 | 2.92 | 2.92 | 2.92 | 2.92 | 2.92 | 2.92 | 2.92 |
| Carboxymethylcellulose (sodium) (c) | — | 0.70 | 0.70 | 0.70 | 0.70 | 0.70 | 0.70 | 0.70 | 0.70 | 0.70 |
| Carboxymethylcellulose (sodium) (d) | — | — | — | — | — | — | — | — | — | — |
| Carboxymethylcellulose (sodium) (e) | — | — | — | — | — | — | — | — | — | — |
| Carboxymethylcellulose (sodium) (f) | — | — | — | — | — | — | — | — | — | — |
| Hydroxypropyl methylcellulose (g) | — | — | — | — | — | — | — | — | — | — |
| Methyl cellulose (h) | — | — | — | — | — | — | — | — | — | — |
| Powdered cellulose gel (i) | — | 2.92 | — | — | — | — | — | — | — | — |
| Fiber blend (j) | — | 0.50 | 0.50 | 0.50 | 0.50 | 0.50 | 0.50 | 0.50 | 0.50 | — |
| Oat fiber (k) | — | — | 1.46 | — | — | — | — | — | — | — |
| Soy protein isolate (l) | — | 3.70 | 3.70 | 3.70 | — | 7.40 | — | — | — | — |
| Sodium/Calcium caseinate (m) | — | 3.70 | 3.70 | 3.70 | — | — | 7.40 | — | — | — |
| Gum arabic (n) | — | 2.15 | 2.15 | 2.15 | 2.15 | 2.15 | 2.15 | 2.15 | 2.15 | 2.15 |
| Ammonium-calcium alginate (o) | — | — | — | — | — | — | — | — | — | — |
| Xanthan gum (p) | — | — | — | — | — | — | — | — | — | — |
| Guar gum (q) | — | — | — | — | — | — | — | — | — | — |

TABLE 2-continued

Composition Comprising Cellulose/Fiber/Protein/Gum Additives

| | | | | | | | | | | |
|---|---|---|---|---|---|---|---|---|---|---|
| Non fat dry milk solids (r) | — | 23.0 | 23.0 | 23.0 | — | — | — | 23.0 | — | — |
| Polysorbate-60 (s) | — | — | — | — | — | — | — | — | 2.00 | — |
| OBSERVED PROPERTIES AFTER SHEAR: | | | | | | | | | | |
| GEL | NO | NO | SL. | YES | YES | YES | YES | YES | YES | YES |
| THICKESESS | NO | V.SL. | SL. | YES | YES | YES | YES | YES | YES | YES |
| AERATION | NO | SL. | SL. | YES | SL. | MOD. | MOD. | YES | MOD | SL. |
| OPACITY | NO | SL. | SL. | YES | SL. | MOD. | MOD. | YES | MOD | SL. |

(*) Control or Comparison Example
(a) Base—13.13 g Sucrose/Fructose, 0.37 g each sodium chloride and potassium chloride
(b) FMC AVICEL(R) CL-611—Spray dried colloidal mixture of cellulose gel (microcrystalline cellulose) and cellulose gum (sodium carboxy methyl cellulose)
(c) Multi-Kem Corp., CELLOGEN(R) HP 6HS.9
(d) Aqualon CMC 7 HC4F
(e) Aqualon CMC HFPH
(f) Multi-Kem Corp., CELLOGEN(R) HP 8A
(g) Dow Chemical Co., METHOCEL(R) K100M
(h) Dow METHOCEL(R) A4M copolymer resin, 6,000 psi flex mod
(i) James River Corp., 100% powdered alpha-cellulose gel, BW-300 FCC
(j) 25% each of pectin, guar, corn fiber and oat bran
(k) 100% oat fiber
(l) Protein Technologies International, PP660
(m) Kerry Proteins, Inc., K428, sodium/calcium caseinate
(n) Florexco, Inc., spray dried gum arabic
(o) Kelco Co., KELTOSE(R)
(p) Kelco Co., KELTROL(R)-TF
(q) Multi-Kem Corp., fine guar gum
(r) Clofine Co., spray-dried nonfat dry milk solids
(s) Witco Co., Polysorbste-60

| Example Composition (pbw): | 11 | 12* | 13* | 14* | 15* | 16* | 17* | 18* | 19* | 20* |
|---|---|---|---|---|---|---|---|---|---|---|
| Base (a) | 13.5 | 13.5 | 13.5 | 13.5 | 13.5 | 13.5 | 13.5 | 13.5 | 13.5 | 13.5 |
| Water | 200.0 | 200.0 | 200.0 | 200.0 | 200.0 | 200.0 | 200.0 | 200.0 | 200.0 | 200.0 |
| Colloidal Mixture, cellulose gel/cellulose gum (b) | 2.92 | 2.92 | — | — | 5.84 | — | — | — | 2.92 | 2.92 |
| Carboxymethylcellulose (sodium) (c) | 0.70 | — | 0.70 | 1.40 | — | 0.70 | 0.70 | — | — | — |
| Carboxymethylcellulose (sodium) (d) | — | — | — | — | — | — | — | — | — | — |
| Carboxymethylcellulose (sodium) (e) | — | — | — | — | — | — | — | — | — | — |
| Carboxymethylcellulose (sodium) (f) | — | — | — | — | — | — | — | — | — | — |
| Hydroxypropyl methylcellulose (g) | — | — | — | — | — | — | — | — | — | — |
| Methyl cellulose (h) | — | — | — | — | — | — | — | — | — | — |
| Powdered cellulose gel (i) | — | — | — | — | — | — | — | — | — | — |
| Fiber blend (j) | — | — | — | — | — | — | — | — | — | — |
| Oat fiber (k) | — | — | — | — | — | — | — | — | — | — |
| Soy protein isolate (l) | — | — | — | — | — | — | — | — | — | — |
| Sodium/Calcium caseinate (m) | — | — | — | — | — | — | — | — | — | — |
| Gum arabic (n) | — | — | — | — | — | — | — | — | — | — |
| Ammonium-calcium alginate (o) | — | — | — | — | — | 0.70 | — | — | 0.70 | — |
| Xanthan gum (p) | — | — | — | — | — | — | 0.70 | — | — | 0.70 |
| Guar gum (q) | — | — | — | — | — | — | — | 0.70 | — | — |
| Non fat dry milk solids (r) | — | — | — | — | — | — | — | — | — | — |
| Polysorbate-60 (s) | — | — | — | — | — | — | — | — | — | — |
| OBSERVED PROPERTIES AFTER SHEAR: | | | | | | | | | | |
| GEL | YES | NO | NO | NO | NO | NO | NO | NO | NO | NO |
| THICKNESS | YES | NO | NO | SL. | NO | V.SL. | V.SL. | V.SL. | NO | NO |
| AERATION | SL. | NO | NO | NO | V.SL. | NO | NO | V.SL. | NO | NO |
| OPACITY | SL. | NO | NO | NO | NO | NO | NO | NO | NO | NO |

(*) Control or Comparison Example
(a)–(s) See footnote definitions above

| Example Composition (pbw): | 21* | 22 | 23 | 24* | 25* | 26* | 27 | 28 |
|---|---|---|---|---|---|---|---|---|
| Base (a) | 13.5 | 13.5 | 13.5 | 13.5 | 13.5 | 13.5 | 13.5 | 13.5 |
| Water | 200.0 | 200.0 | 200.0 | 200.0 | 200.0 | 200.0 | 200.0 | 200.0 |
| Colloidal Mixture, cellulose gel/cellulose gum (b) | 2.92 | 2.92 | 2.92 | 2.92 | 2.92 | 2.92 | 2.92 | 5.84 |
| Carboxymethylcellulose (sodium) (c) | — | — | — | — | — | — | 1.40 | 0.60 |
| Carboxymethylcellulose (sodium) (d) | — | 0.70 | — | — | — | — | — | — |
| Carboxymethylcellulose (sodium) (e) | — | — | 0.70 | — | — | — | — | — |
| Carboxymethylcellulose (sodium) (f) | — | — | — | 0.70 | — | — | — | — |
| Hydroxypropyl methylcellulose (g) | — | — | — | — | 0.70 | — | — | — |
| Methyl cellulose (h) | — | — | — | — | — | 0.70 | — | — |
| Powdered cellulose gel (i) | — | — | — | — | — | — | — | — |

TABLE 2-continued

Composition Comprising Cellulose/Fiber/Protein/Gum Additives

| | | | | | | | | |
|---|---|---|---|---|---|---|---|---|
| Fiber blend (j) | — | — | — | — | — | — | — | — |
| Oat fiber (k) | — | — | — | — | — | — | — | — |
| Soy protein isolate (l) | — | — | — | — | — | — | — | — |
| Sodium/Calcium caseinate (m) | — | — | — | — | — | — | — | — |
| Gum arabic (n) | — | — | — | — | — | — | — | — |
| Ammonium-calcium alginate (o) | — | — | — | — | — | — | — | — |
| Xanthan gum (p) | — | — | — | — | — | — | — | — |
| Guar gum (q) | 0.70 | — | — | — | — | — | — | — |
| Non fat dry milk solids (r) | — | — | — | — | — | — | — | — |
| Polysorbate-60 (s) | — | — | — | — | — | — | — | — |
| OBSERVED PROPERTIES AFTER SHEAR: | | | | | | | | |
| GEL | V.SL. | MOD. | MOD. | NO | NO | NO | YES | YES |
| THICKNESS | V.SL | MOD. | MOD. | NO | ND | NO | YES | YES |
| AERATION | ND | SL. | SL. | ND | YES | YES | SL. | SL. |
| OPACITY | NO | SL. | SL. | NO | YES | YES | SL. | SL. |

(*) Control or Comparison Example
(a)–(s) See footnote definitions above

| Example Composition (pbw): | 29 | 30 | 31 | 32 | 33 |
|---|---|---|---|---|---|
| Base (a) | 13.5 | 13.5 | 13.5 | 13.5 | 13.5 |
| Water | 200.0 | 200.0 | 200.0 | 200.0 | 200.0 |
| Colloidal Mixture, cellulose gel/cellulose gum (b) | 5.84 | 2.92 | 1.47 | 1.47 | 1.47 |
| Carboxymethylcellulose (sodium) (c) | 0.30 | 0.30 | 0.30 | 0.65 | 1.40 |
| Carboxymethylcellulose (sodius) (d) | — | — | — | — | — |
| Carboxymethylcellulose (sodium) (e) | — | — | — | — | — |
| Carboxymethylcellulose (sodium) (f) | — | — | — | — | — |
| Hydroxypropyl methylcellulose (g) | — | — | — | — | — |
| Methyl cellulose (h) | — | — | — | — | — |
| Powdered cellulose gel (i) | — | — | — | — | — |
| Fiber blend (j) | — | — | — | — | — |
| Oat fiber (k) | — | — | — | — | — |
| Soy protein isolate (l) | — | — | — | — | — |
| Sodium/Calcium caseinate (m) | — | — | — | — | — |
| Gum arabic (n) | — | — | — | — | — |
| Ammonium-calcium alginate (o) | — | — | — | — | — |
| Xanthan gum (p) | — | — | — | — | — |
| Guar gum (q) | — | — | — | — | — |
| Non fat dry milk solids (r) | — | — | — | — | — |
| Polysorbate-60 (s) | — | — | — | — | — |
| OBSERVED PROPERTIES AFTER SHEAR: | | | | | |
| GEL | MOD. | SL. | V.SL. | SL. | MOD. |
| THICKNESS | MOD. | SL. | V.SL. | SL. | MOD. |
| AERATION | SL. | SL. | SL. | SL. | SL. |
| OPACITY | SL. | SL. | SL. | SL. | SL. |

(*) Control or Comparison Example
(a)–(s) See footnote definitions above

The formulation of Example 4 was particularly good. The sheared composition gelled and cavitated after 20 seconds. It aerated well, had good opacity, no off flavor, a shiny top, and did not easily flow together, all excellent attributes of such a product.

If the procedure of Example 4 was repeated, omitting the cellulose gel and leaving sodium carboxymethylcellulose as the sole cellulose derivative, the composition was watery with no air incorporation, and while thicker than the watery base composition, alone, after high speed shear, it was unsuitable for the desired purpose.

If the procedure of Example 4 was repeated, omitting the sodium carboxymethylcellulose and leaving the microcrystalline cellulose gel as the sole cellulose derivative, the composition produced was watery and very, very slightly aerated after high speed shearing and unsuitable for the desired purpose.

The results of the foregoing Examples, taken together permit the following conclusions:

(i) A gum blend and gum arabic are not necessary to produce a high shear mousse;

(ii) A cellulose gel and a cellulose gum both need to be used together to make a high shear mousse;

(iii) Many varieties of cellulose gum, and other dietary fibers and gums can be used, the protein sources can be varied, and the amounts of the key ingredients can be varied within judiciously selected limits without having an adverse effect on the characteristics of the product.

The prior art mentioned hereinabove is incorporated by reference.

Many variations of the present invention will suggest themselves to those skilled in this art in view of the above-detailed description. For example, other cellulose gums and gels can be used, so long as they comprise a colloidal spray-dried mixture of gel and gum. Instead of a chocolate flavored dryblend, strawberry-flavored and vanilla flavored dryblends, as well as other flavored dry blends can be formulated. Various aerating agents such as Polysorbate 60 (Witco) or METHOCEL® (Dow) can be used for a lighter or more aerated mousse. Furthermore, other gums and/or dietary fibers may be used to vary the texture and mouth feel. Other protein sources such as milk protein, soy protein, egg albumin, albumin, wheat proteins, and the like, may be used at desired levels to vary the essential amino acid content and total protein content. Various sweeteners such as sucrose, fructose, dextrose, sorbitol, and artificial sweeteners such as aspartame, saccharin and acesulfame-K (SUNETTE® Hoechst, New Jersey, U.S.A.) may be used depending in desired sweetness and caloric content. Other simple or complex carbohydrates may be incorporated. All such obvious variations are within the full intended scope of the appended claims.

What is claimed is:

1. A dry, nutritional meal replacement composition comprising a cellulose gel and a cellulose gum, and nutritionally effective amounts of proteins, carbohydrates, dietary fiber, vitamins and minerals, wherein each serving provides about 6 g of fiber, 16 g of protein, about 31 g of carbohydrates and 220 calories after mixing with milk said composition being adapted to mix with a liquid to provide a drinkable beverage when mixed with low shear and a pudding when mixed with high shear.

2. A dry nutritional meal replacement composition which, when mixed with an ingestable liquid and ingested, elicits satiety and can be used as a total meal replacement without adverse gastointestinal disturbances, comprising (A) a protein blend comprising protein concentrate in an amount of about 25% by weight;

(B) a blend comprising a cellulose gel and cellulose gum in an amount of about 10% by weight;

(C) a vitamin blend in an amount of about 0.81% by weight;

(D) a mineral blend in an amount of about 1.4% by weight;

(E) a natural or an artificial sweetener or a mixture thereof in an amount of about 38% by weight;

(F) dietary fibers other than (B) in an amount of about 8% by weight;

(G) about 1.1% of a flavoring agent, alone or in further combination with a coloring agent, said composition further being adapted such that, when mixed with said liquid at low shear a drinkable beverage results and, when mixed with said liquid at high shear a pudding results.

3. A composition as defined in claim 2 wherein said protein blend further comprises whey protein concentrate, caseinate and soy isolate, in combined amounts of about 20–30% by weight.

4. A composition as defined in claim 3 wherein said protein blend comprises about 24.9% by weight.

* * * * *